(No Model.)
F. A. BROWNELL.
TRIPOD.
No. 588,552. Patented Aug. 24, 1897.
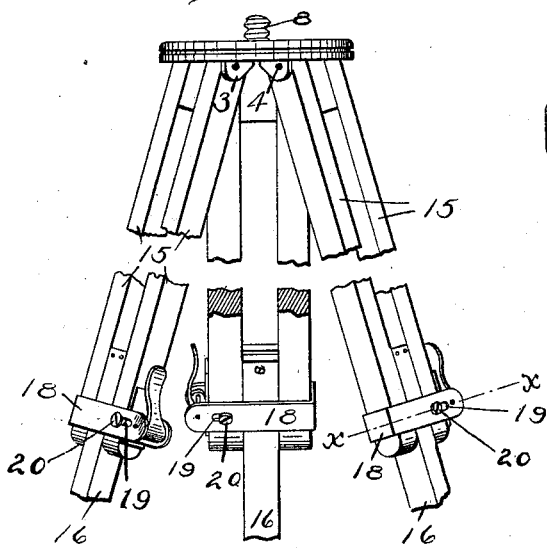
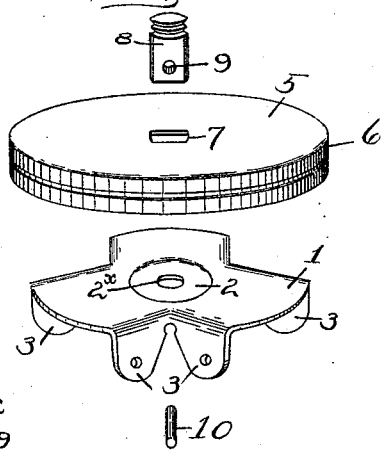
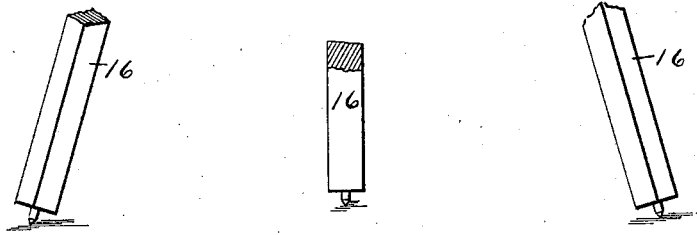
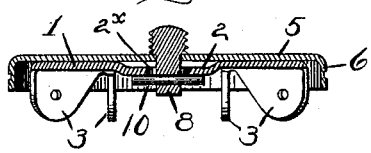
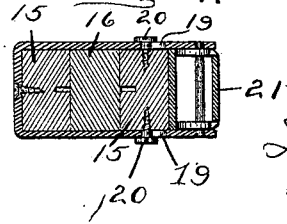
Witnesses.
Inventor.
Attorney.

UNITED STATES PATENT OFFICE.

FRANK A. BROWNELL, OF ROCHESTER, NEW YORK, ASSIGNOR TO THE EASTMAN KODAK COMPANY, OF NEW YORK.

TRIPOD.

SPECIFICATION forming part of Letters Patent No. 588,552, dated August 24, 1897.

Application filed April 5, 1897. Serial No. 630,694. (No model.)

*To all whom it may concern:*

Be it known that I, FRANK A. BROWNELL, of Rochester, in the county of Monroe and State of New York, have invented certain new and useful Improvements in Tripods; and I do hereby declare the following to be a full, clear, and exact description of the same, reference being had to the accompanying drawings, forming a part of this specification, and to the reference-numerals marked thereon.

My present invention relates to tripods or supports particularly adapted for holding photographic cameras, though capable of use for other purposes; and it has for its object to produce a device that is simple and cheap in construction and in which the various rotary adjustments of the instrument may be readily accomplished without the necessity of detaching it from the support or moving the supporting-legs; and to these and other ends it consists in the improvements hereinafter described, the novel features being pointed out particularly in the claims at the end of this specification.

In the drawings, Figure 1 is a side elevation of a tripod constructed in accordance with my invention; Fig. 2, a perspective view of the operating parts removed; Fig. 3, a cross-sectional view of the tripod-head; Fig. 4, a sectional view on the line $x\,x$ of Fig. 1.

Similar reference-numerals in the several figures indicate similar parts.

Heretofore in devices of this character the camera or other instrument has been attached to the tripod-head by a screw passing directly through the latter and entering the lower side of the former, and after the tripod had been spread and set if it became desirable to point the camera in a different direction it was necessary either to move the tripod bodily or else to loosen the connecting-screw, which consumed considerable time, and if the tripod had to be moved it oftentimes subjected the operator to serious inconvenience, owing to the difficulty of properly positioning the legs if on rough ground. In order to overcome these difficulties and to simplify and cheapen the construction, I make the base-plate 1 of the tripod-head of a single piece of sheet metal slightly recessed at the center, as at 2, and having the central perforation $2^\times$ and the downwardly-turned ears or lugs 3, between which latter the legs are pivoted by pins 4. Mounted upon the plate 1 to turn freely is an instrument-supporting plate 5, in the form of a disk, also of sheet metal, having the flange 6 at its periphery and an irregular-shaped aperture 7 at its center, through which latter passes the securing-bolt 8, having its shank angular or irregular to correspond with the aperture 7, its upper end threaded, as shown, and its lower end having the transverse aperture 9 for the reception of the pin or key 10, which when the parts are assembled, as in Fig. 3, engages the under side of the plate 1 at the sides of the aperture $2^\times$, constituting a laterally-extending head for the bolt and prevents the vertical movement of the bolt. From this construction it will be seen that the camera or other instrument may be readily attached by entering the screw 8 in the usual threaded aperture in the bottom and then turning the screw by rotating the disk 5, (the periphery of the latter being preferably milled or roughened,) drawing the instrument tightly down upon the disk and also drawing the key 10 against the under side of plate 1 and holding the parts firmly. The friction between the key 10 and the under side of the plate 1 is less than that between the instrument and disk, and while sufficient to hold the instrument and disk in firm contact will permit the two latter to be turned around on the plate 1 to point the instrument in any direction without loosening the connection between the screw and disk.

When desirable to remove the instrument, it is only necessary to steady it with one hand and rotate the disk backward with the other, withdrawing the screw from its socket in the instrument, and this without the necessity heretofore existing of reaching between the legs of the tripod to disengage the screw.

The legs attached to the plate 1 may be of any suitable construction, but I prefer to make them extensible and in two sections, the upper consisting of strips 15 15 of light wood connected to the plate by pivot 4, and the lower section of a strip 16 sliding between the others and suitably guided between strips 15, and secured in adjusted position by means of a clamp consisting of a metal strap 18, secured at its middle to one strip 15, having slots 19, through which the screws 20 pass loosely into the other strip 15, and between its free ends is pivoted a cam-lever 21, operating, when turned to the position in Fig. 1, to clamp the leg-sections firmly together, but permitting their relative adjustment when loosened.

Tripods made according to my invention are very simple, light, and may be very cheaply constructed, besides which the capabilities of adjustment mentioned are very desirable, particularly when small photographic cameras are to be mounted upon the tripod.

While the device is termed a "tripod" and only three legs are necessary, it will be understood that lugs could be provided on the plate 1 to receive four or more legs, if desired.

I claim as my invention—

1. In a tripod-head, the combination with the base-plate, of the instrument-supporting plate rotatable thereon, the bolt extending through the two plates, movable longitudinally independently thereof, and positively connected to the supporting-plate to rotate therewith, said bolt having the threaded upper end and the head beneath the base-plate, substantially as described.

2. In a tripod-head, the combination with the base-plate having the central aperture and the downwardly-extending ears, of the supporting-plate having the irregular aperture, the bolt fitting said aperture and having the threaded upper end and the laterally-extended lower end engaging the under side of the base-plate, substantially as described.

3. In a tripod-head, the combination with the base-plate, having the aperture and the ears, the rotatable supporting-disk having the flange at the periphery and the irregular central aperture, the bolt having the threaded upper end, the irregular shank and the perforation at its lower end, and the pin extending through and fitting the aperture in the bolt and engaging the base-plate, substantially as described.

4. In a tripod-head, the combination with the stationary base-plate, and a rotatable instrument-supporting plate mounted upon the former, of a screw adapted to engage an instrument on the supporting-plate and frictionally engaging with the under side of the base-plate, said screw being movable longitudinally independently of the supporting-plate and positively connected to the latter to rotate therewith, substantially as described.

5. In a tripod-head, the combination with the base-plate, having the aperture, and a rotatable supporting-plate thereon, having the irregular aperture, of the securing-bolt having the threaded upper end, the irregular shank fitting the aperture in the supporting-plate, and the laterally-extended lower head adapted to engage the base-plate, substantially as described.

FRANK A. BROWNELL.

Witnesses:
F. F. CHURCH,
G. A. RODA.